United States Patent Office 3,329,202
Patented July 4, 1967

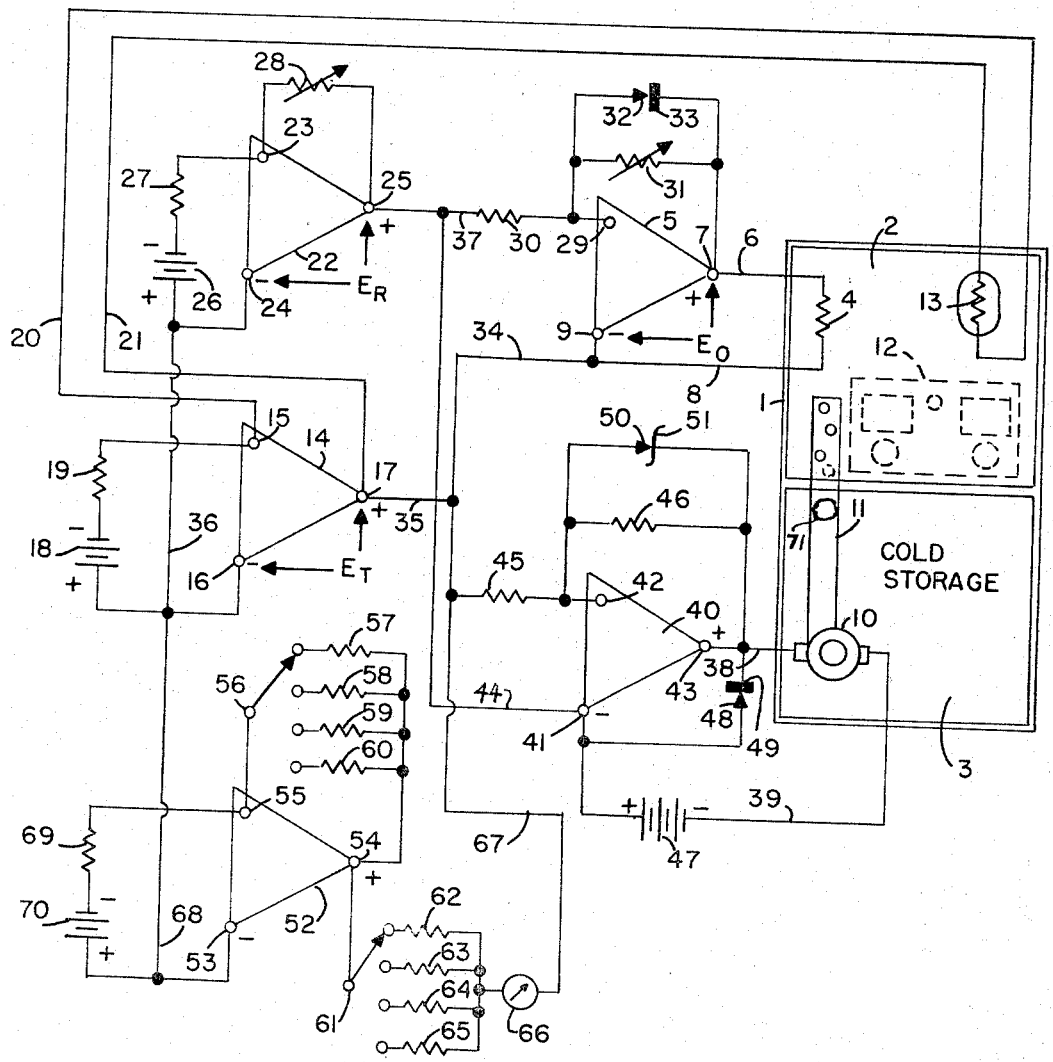

3,329,202
TEMPERATURE CONTROL CHAMBER UTILIZING OPERATIONAL POWER SUPPLIES
Paul S. Birman, Flushing, N.Y., assignor to Forbro Design Corp., New York, N.Y., a corporation of New York
Filed July 19, 1965, Ser. No. 473,033
4 Claims. (Cl. 165—26)

The present invention concerns controlled temperature chambers and, in particular, operationally controlled proportional heating and cooling chambers.

The testing of many types of electronic equipment includes tests to determine the effect of temperature on such equipment. As such tests become more demanding, equipment capable of closer temperature control and capable of maintaining such control for longer periods becomes necessary. It is also a requirement that the temperature control system be capable of raising the temperature above or lowering it below the ambient. Furthermore, the temperature control must be smooth and continuous. Most temperature chambers hitherto available have stressed range of control rather than accuracy and long term stability.

The present invention concerns a temperature control system capable of extremely accurate temperature control and exceptional long term stability. The temperature in the chamber being controlled is sensed by temperature sensitive resistors. The resistance of these temperature sensing resistors is converted to a proportional voltage by means of an operationally programmed power supply, acting as a resistance to voltage translator. This proportional voltage is compared with a reference control voltage from a second operational power supply and the difference is used to drive a third operational power supply. This operational power supply in turn supplies power to the heater in the controlled temperature chamber. This system thus forms a closed loop feed back system with extremely high open loop gain and capable of very close proportional control. While this heating loop serves to provide and control temperatures above the ambient, a somewhat analogous system provides cooling below the ambient.

The cooling provisions utilize the same temperature sensing resistor, operational power supply resistance to voltage converter and reference control operational power supply voltage source. Cooling is provided by means of a fan which blows cold air from a cold air storage chamber in accordance with the control signal as described above. The control signal is applied, in reversed polarity to the heating control signal, to a second operational power supply which drives the cooling fan.

Accordingly one object of the present invention is to provide a controlled temperature chamber capable of extremely accurate temperature control.

Another object is to provide such a controlled temperature chamber capable of maintaining an accurately controlled temperature for extended periods of time.

Still another object is to provide such a chamber which can be controlled above or below ambient at will.

A further object is to provide temperature control which is sensitive and smooth in operation.

These and other objects of the present invention will be apparent from the detailed description of the invention given in connection with the figure of the drawing.

The figure of the drawing is a representation partly in block diagram and partly schematic of a preferred form of the present invention.

The figure shows the controlled temperature chamber 1 comprising two main compartments, one the controlled temperature compartment 2 and the cold storage compartment 3. Heating of the controlled temperature compartment is provided by means of heater resistor 4 energized by power from operational power supply 5 connected over lead 6 from positive output terminal 7 and lead 8 from common negative terminal 9. The functioning of this power supply will be described in detail below. Cooling of the controlled temperature compartment is provided by blowing air by means of motor-blower 10 from the cold storage compartment 3 through connecting tube 11 into the controlled temperature compartment 2. Apparatus to be tested in the controlled temperature compartment 2 is suggested at 12. The temperature in the controlled temperature compartment is detected by means of a temperature sensitive resistor 13.

The object of the system is to control the heating of resistor 4 or the blowing of cold air from chamber 3 in such a way as to maintain the temperature in the controlled temperature chamber 2 at a predetermined value as sensed by the tempearture sensing resistor 13. The first step is to convert the resistance value of temperature sensitive resistor 13 (or several temperature sensing resistors in series or series parallel combination) to a proportional voltage. This is accomplished by means of an operational power supply 14 having an input terminal 15, a common terminal 16 and an output terminal 17. The input circuit consists of a voltage source 18 connected between common terminal 16 and input terminal 15 through current reference resistor 19. The temperature sensitive resistor 13 is connected over leads 20 and 21 to input terminal 15 and output terminal 17 respectively. This operational amplifier 14 is shown in symbolic form and is to be understood to represent a conventional operational amplifier, details such as power sources not being shown. The output voltage $E_T$ appearing between output terminal 17 and common terminal 16 will be equal to the resistance of resistor 13 divided by the resistance of resistor 19 multiplied by the voltage of voltage source 18. This last is in accordance with familiar operational amplifier theory. Thus, for given values of voltage 18 and resistor 19, the output voltage $E_T$ will be proportional to the resistance of tempearture sensitive resistor 13. In this way a voltage is provided which is a function of the temperature in the controlled temperature compartment 2.

The next step is to provide an adjustable reference voltage. This is accomplished in a somewhat similar manner by means of a second operational power supply 22. This operational amplifier 22 is provided with an input terminal 23, a common terminal 24 and an output terminal 25. Input voltage source 26 is connected through current determining resistor 27 between input terminal 23 and common terminal 24. An adjustable feed-back resistor 28 is connected from output terimnal 25 to input terminal 23. The output voltage $E_R$ appearing between output terminal 25 and common terminal 24 will be, in accordance with standard operational amplifier theory, equal to the resistance of resistor 28, divided by the resistance of resistor 27 and multiplied by the voltage of source 26. Thus, reference voltage $E_R$ may be programmed as desired by varying adjustable resistor 28. The difference between $E_T$ and $E_R$ is applied between common terminal 9 and input terminal 29 of operational power supply 5 and serves to control the power supplied to heater resistor 4.

The operational power supply 5 for purposes of this invention may be considered as any suitable operational power supply capable of supplying the required output power and responding to current applied to input terminal 29 with a gain factor determined by the resistance of feed-back resistor 31. The output voltage $E_O$ applied to heater resistor 4 will be equal to the input current to terminal 29 multiplied by the resistance of feed-back resistor 31. The input current to terminal 29 will be equal to the voltage applied between common terminal 9 and input terminal 29 through current determining resistor 30.

The applied voltage is the difference voltage between $E_T$ and $E_R$ set forth above. Terminal 9 is connected over leads 34 and 35 to output terminal 17 forming one side of the source of voltage $E_T$. The other side of the source of voltage $E_T$, which is common terminal 16, is connected over lead 36 to common terminal 24 which forms one side of the source of voltage $E_R$. The other side of the source of voltage $E_R$, output terminal 25, is connected over lead 37 to one end of current determining resistor 30 the other end of which is connected to input terminal 29. As long as the temperature dependent voltage $E_T$ is greater than the reference voltage $E_R$, input terminal 29 will be maintained at a negative polarity with respect to common terminal 9. This will program amplifier 5 to supply current to heater resistor 4 to provide more heat to compartment 2. As compartment is heated to a higher and higher temperature, the resistance of temperature sensitive resistor 13, assumed here to have a negative temperature coefficient, will decrease which in turn will decrease voltage $E_T$. When $E_T$ approaches $E_R$, current will cease to flow to input terminal 29 and heating current will cease to flow in heater resistor 4. This then will be a condition of equilibrium and compartment 2 will be operating at a predetermined temperature. Actually some heat will be required to supply the heat losses such as conduction through the chamber walls etc.

Now, if $E_R$ is increased by increasing the value of resistance of resistor 28, the reference voltage $E_R$ will increase and negative voltage to terminal 29 will be blocked until $E_T$ increases to equal and become greater than $E_R$. As the temperature of compartment falls due to lack of heating from heater 4 (or due to blowing in of cold air as will be described below) the resistance of resistor 13 increases increasing $E_T$ until it equals and becomes greater than $E_R$. When $E_T$ becomes greater than $E_R$, terminal 29 is driven negative and power is reapplied to heater resistor 4. Equilibrium at a new compartment temperature will be reached when resistor 13 is such that $E_T$ approximately equals $E_R$. As mentioned above heat losses must be supplied. Decreasing resistor 28 will decrease $E_R$ and $E_T$ will supply negative potential to terminal 29 until a new equilibrium is reached at a higher compartment temperature. Thus, the temperature of compartment 2 can be programmed up and down by means of the adjustment of resistor 28.

In order to speed the reaching of equilibrium temperatures on the decreasing temperature side and to permit compartment temperatures below the ambient temperature, the cooling means to be described is provided. The cold compartment 3 is a space in which cold air is produced by any suitable means, details of which will not be given, such as Dry Ice, gas expansion, mechanical refrigeration, etc. This cold air may be pumped into the controlled temperature chamber 2 by means of motor-fan 10 blowing air through tube 11. To control the flow of cold air into chamber 2 it is only necessary to control the operation of motor-fan 10. The motor of the motor-fan combination 10 is driven by power supplied over leads 38 and 39. Controlled power is supplied over these leads by operational power supply 40 controlled by the difference between $E_T$ and $E_R$ but in reversed polarity to the control applied to the heating circuit. Power supply 40 includes a common terminal 41, an input terminal 42 and an output terminal 43. The input circuit between common terminal 41 and input terminal 42 is connected over lead 44 to the output terminal 25 which is the positive side of voltage $E_R$, over lead 36 connecting common terminal 24, the negative side of voltage $E_R$, and common terminal 16, the negative side of voltage $E_T$, lead 35 connecting output terminal 17, the positive side of voltage $E_T$, and current control resistor 45 and so to input terminal 42. The gain of power supply 40 is controlled by resistor 46 connected from output terminal 43 to input terminal 42. Since the voltages $E_T$ and $E_R$ are connected in series and reversed polarity to the connection applied to the heating circuit, the cooling control power supply will receive an energizing negative input signal on input terminal 42 when $E_T$ is smaller than $E_R$, i.e. when the heating circuit is deenergized. The controlled output of power supply 40 appearing between output terminal 43 and common terminal 41 is applied to the motor of motor-fan 10 over leads 38 and 39 through threshold drive voltage source 47. This threshold drive voltage source 47 is chosen to overcome the inertia of the motor when power supply 40 is deenergized so that more rapid pickup is attained when energy is supplied from power supply 40. Diode 48–49 is connected across the output of power supply 40 in order to pass current from source 47 in the absence of power from power supply 40. Zener diode 50–51 connected from terminal 43 to terminal 42 serves to limit the maximum output of power supply 40 and hence the maximum voltage applied to the motor of motor-fan 10.

The cooling provisions described above is utilized to permit operation of the controlled temperature chamber below ambient as well as to speed temperature readjustment when it is programmed from a higher to a lower temperature. The cooling cycle operation is essentially the same as the heating cycle operation except that cooling is called for and supplied when $E_T$ is less than $E_R$ indicating that the compartment chamber is above the temperature at which equilibrium exists.

Since it is often desirable to indicate the compartment temperature an additional operational amplifier 52 is provided having a common terminal 53, an output terminal 54 and an input terminal 55.

The input terminal 55 is provided with a reference current from reference voltage source 70 applied through reference resistance 69. A number of output voltage programming resistors 57–58–59–60 are switchable by means of switch 56 between output terminal 54 and input terminal 55 in order to set the output voltage between common terminal 53 and output terminal 54. This output voltage will then be equal to the reference voltage divided by the reference resistance multiplied by the programming resistance. The difference between this output voltage and the chamber temperature dependent voltage from amplifier 14 is applied over leads 35 and 67 through switch 61 and one of meter multiplier resistors 62–63–64–65 to meter 66. By thus being able to select the voltage difference to be measured and the meter sensitivity substantially linear equal percentage incremental scales can be provided. This leads to the facility of being able to read temperature of the chamber to a high degree of accuracy at any point on the scale.

An interesting feature of the cooling transfer means is the use of a loaded (weighted) float valve in a perforated pipe. This device allows the use of an ordinary D.C. fan motor by linearizing the air flow vs drive voltage transfer function and in addition sealing the transfer mechanism against reverse leakage. Also interesting (and vital) is the means of pre-biasing used to assure a clean "cross over" from heating to cooling without a dead band. For example: use of summing configuration in the two power supplies and the means employed to keep the motor rotating (although not pumping) so as to avoid inertial start-up problems. Also, a voltage limiting circuit is used to good effect in the operating chambers.

In order to prevent reversal of the voltage across feedback resistor 31 diode 32–33 is connected with its anode 32 connected to input terminal 29 and its cathode 33 connected to output terminal 7.

In order to more smoothly control the air flow in pipe 11, a small amount of preloading in the form of a light ball 71 may be provided.

While only one form of the present invention has been shown and described, many modifications will be apparent to those skilled in the art and within the spirit and scope of the invention as set forth in particular in the appended claims.

What is claimed is:

1. In a temperature control system, the combination of, a chamber the temperature of which is to be controlled, a temperature sensing resistor within said chamber, a heater resistor within said chamber, an operational amplifier coupled to said temperature sensing resistor for providing a source of voltage which is a function of the resistance of said temperature sensing resistor, wherein said temperature sensing resistor is connected to provide the feedback resistance of said operational amplifier, a source of adjustable reference voltage comprising an operational amplifier including an adjustable feedback resistor for at least partially determining said voltage connected in opposed polarity to the first said source of voltage, a power operational amplifier including input and output circuits, an adjustable feedback resistor connected to said power operational amplifier for controlling the gain thereof, means for applying the said oppositely poled combined sources of voltage through a current determining resistor to said input and connections between said output and said heating resistor for heating said chamber in accordance with the difference between the two said sources of voltage.

2. In a temperature control system, the combination of, a chamber the temperature of which is to be controlled, a temperature sensing resistor within said chamber, a heater resistor within said chamber, an operational amplifier coupled to said temperature sensing resistor and providing a source of voltage which is a function of the resistance of said temperature sensing resistor, a source of adjustable reference voltage connected in opposed polarity to the first said source of voltage, a power operational amplifier including input and output circuits, means for applying said oppositely poled combined sources of voltage through a current determining resistor to said input, connections between said output and said heating resistor for heating said chamber in accordance with the difference between the two said sources of voltage, a cold storage compartment adjacent to said chamber, motor driven fan means adapted to move air from said cold storage compartment into the first said chamber, an operational power amplifier connected to said motor to drive said motor in accordance with input command to the last said amplifier, and input connections from said combined source voltages poled oppositely from said polarity connection to the first said power amplifier input for driving said fan when the polarity of said combined source voltages is the opposite of the polarity which activates the heater operational power amplifier.

3. In a temperature control system, the combination of, a chamber the temperature of which is to be controlled, a temperature sensitive resistor within said chamber, an operational amplifier including input means, signal inverting output means and feedback means comprising said temperature sensitive resistor whereby the output voltage of said amplifier at said output means is proportional to the resistance of said temperature sensitive resistor, circuit connections between said temperature sensitive resistor and said input for providing an output voltage across said output means which is a predetermined function of the resistance of said temperature sensitive resistor, a power operational amplifier including input means, output means and adjustable resistor feedback means, a source of adjustable reference voltage including an operational amplifier and an adjustable output voltage control resistor connected to said amplifier, circuit connections between the output means of the first said amplifier, said reference voltage source and the input means of said power amplifier for programming said amplifier in accordance with the difference between said output voltage and said reference voltage, a heater resistor within said chamber and circuit connections between said output means of said power amplifier and said heater resistor for controllably heating said chamber.

4. In a temperature control system, the combination of, a chamber the temperature of which is to be controlled, temperature sensing means within said chamber, an electrical current operated heating device within said chamber, feedback controlled electrical power means for passing electrical current through said heating device in accordance with the response of said temperature sensing means, a cold air storage chamber, an electrical motor operated fan for moving cool air from said cold air storage chamber to said chamber the temperature of which is to be controlled, feedback control means coupled to said motor for driving said motor in response to predetermined temperature conditions within the first said chamber, a source of voltage connected in series with said motor outside said feedback control means for at least partially overcoming the inertia of said motor, and a loaded float valve means positioned to conduct the air from said cold air storage chamber to said temperature controlled chamber for linearizing the air flow vs motor drive voltage transfer function and for sealing said transfer of air against reverse leakage.

References Cited

UNITED STATES PATENTS

| | | | |
|---|---|---|---|
| 3,051,815 | 8/1962 | Hukee et al. | |
| 3,107,285 | 10/1963 | Knapp | 219—505 X |
| 3,122,199 | 2/1964 | Byloff | 165—2 |
| 3,225,822 | 12/1965 | Westling | 165—122 X |
| 3,241,603 | 3/1966 | Nagata. | |
| 3,243,572 | 3/1966 | Vogt et al. | |

ROBERT A. O'LEARY, *Primary Examiner.*

M. A. ANTONAKAS, *Assistant Examiner.*